2,985,225

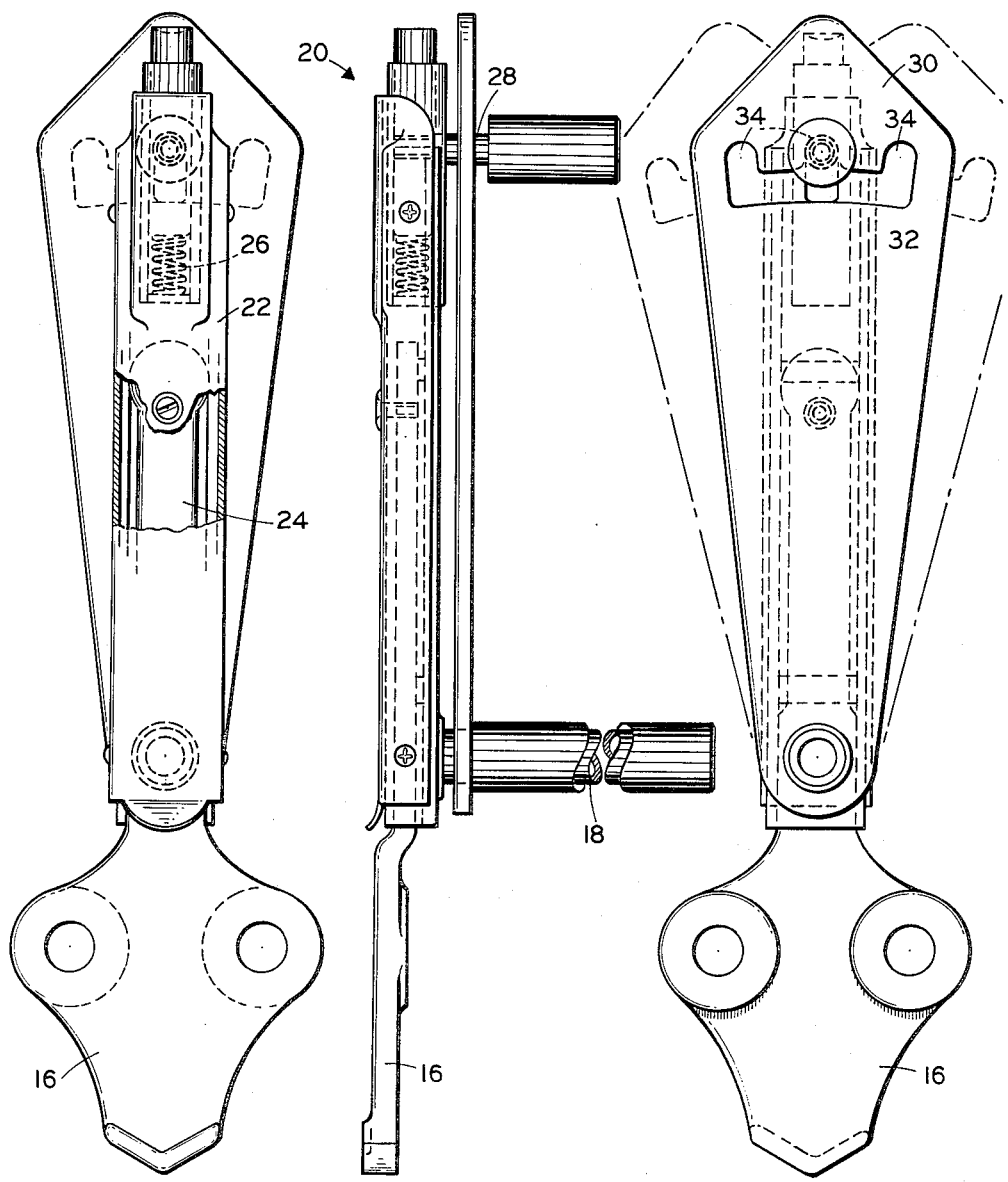

RECLINING WALK-OVER SEAT FOR VEHICLES

Severin B. Hendrickson, Templeton, and Edward Harry Reid, Gardner, Mass., assignors to Heywood-Wakefield Company, Gardner, Mass., a corporation of Massachusetts Filed Apr. 22, 1959, Ser. No. 808,100

3 Claims. (Cl. 155—8)

This invention relates to vehicle chairs, and more particularly to vehicle chairs provided with walk-over means for reversing the direction in which the seat faces, in combination with an adjustable recliner mechanism for the back rest of the chair.

Various arrangements have been provided in the past for reversing the operative direction of vehicle seats, particularly in the railroad industry, and also for providing recliner mechanism for the back rest of the seats. In general these previous constructions have employed means for swiveling the seat around so that the recliner mechanism for the back rest remains in the same relative position as to the seat at all times. Such an arrangement has been successful from certain points of view, but a serious drawback relates to the fact that the reversing mechanism for such seats requires too much space within the vehicle, thereby limiting the number of chairs which can be installed for use. The well known walk-over system for reversing the direction of a railroad car seat does not take up as much room as the pivoting arrangement, but yet it does not have the advantage of a reclining back rest. Moreover, with the conventional walk-over construction, the back rest is a unitary and rigid structure in order to facilitate simultaneous motion of the walk-over linkage mechanisms at each end of the seat.

Accordingly it is an object of our invention to provide in combination means for reversing the operative direction of a vehicle seat and back rest, together with means for independently reclining individual back rests in a double seat.

In the accomplishment of this and other objects of our invention, we employ in a preferred embodiment thereof a seat and back rest mounted on a conventional base and adapted for reversal of operative direction by means of the well known walk-over arrangement in which a pivoted linkage permits the seat and back rest to pivot from a slightly reclining position tipped toward the rear on one side of the seat to a similar position facing the other way on the other side of the seat.

It is a feature of our invention that the walk-over arrangement includes a transverse back rest base frame element extending from one side of the base to the other across the seat. On this transverse base frame element, we pivotally mount individual back rests, one for each occupant of a double seat, and we fix the back rest in relation to the walk-over mechanism in one of a plurality of positions of recline. This is done by means of a latch mechanism for each individual back rest integrally connected to the walk-over frame and engaging one of a plurality of spaced notches arranged in a plate secured to each back rest.

It is a feature of our invention that each occupant of the chair may individually recline his respective back rest without disturbing or changing the position of the back rest of the other occupant of the double seat.

It is a further feature of our invention that it makes no difference in which position of recline either back rest of the double chair assumes with regard to the reversing mechanism since the walk-over frame may be drawn to a reverse position irrespective of the positions of the back rests.

Further objects and features of this invention will best be understood and appreciated from a detailed description of a preferred embodiment thereof, selected for purposes of illustration and shown in the accompanying drawings, in which:

Figs. 3, 4 and 5 are enlarged views of the latch mechanism for securing the back rest to the walk-over frame in one of a plurality of positions of recline.

Figure 1:
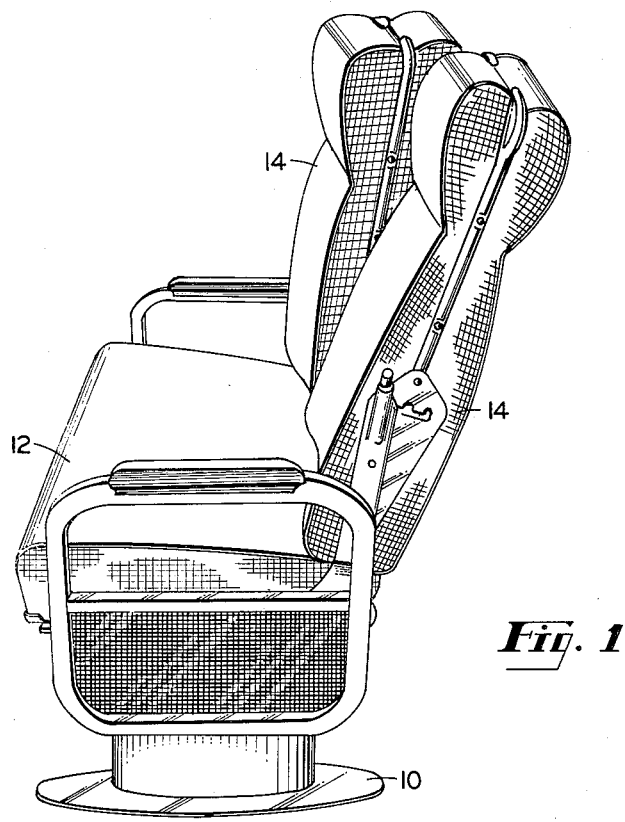
Fig. 1 is a view in perspective of the seat and back rest combination of our invention.
Figure 2:
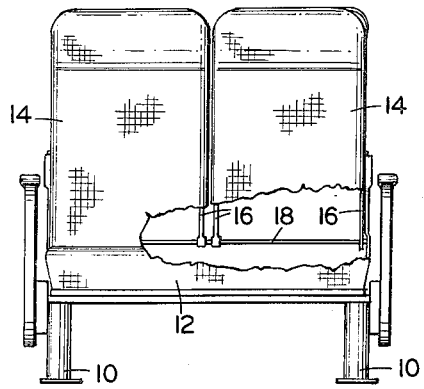
Fig. 2 is a view in front elevation of the seat and back rest of our invention, broken away to expose the transverse frame member to which the back rests are pivoted.

The preferred embodiment of our invention herein shown includes in its general organization a base 10 on which is mounted a seat 12 and a back rest 14. The seat 12 and back rest 14 are adapted for reversal of operative direction with respect to the base 10 by means of a conventional walk-over arrangement as disclosed, for instance, in Patent No. 1,968,434 and well known in the industry. the linkage arrangement for the walk-over mechanism is not shown herein because it forms no part of this invention. For the purpose hereof, we need only refer to an upper support element 16 of the walk-over mechanism and to a transverse frame member or tie rod 18 which interconnects the upper support elements 16 at each end.

The back rest 14 contains two individual elements both pivoted on the transverse frame tie member 18. Thus when the back rests 14 are drawn from one side to the other end of the seat, the frame member 18 simply rides over the seat 12 to assume its new position at the other side.

In order to hold an individual back rest 14 in a plurality of positions of recline, we provide a latch mechanism indicated at 20 and comprising a spring barrel 22 rigidly secured to a vertical extension 24 of the support member 16. A spring 26 is mounted in the upper portion of the spring barrel 22 and serves to hold a latch 28 in operative relation with respect to a multiple stop plate 30 which is in turn secured to the side of the pivoted seat 14. The plate 30 is positioned on the side edge of the seat 14 and is adapted to receive the latch 28 in a slot 32 along one edge of which are three spaced notches 34. The spring 26 urges the latch 28 in the direction of the notches 34 so that, as the back rest in pivoted, the latch 28 automatically snaps into one of the said notches. The notch 34 in the center represents the normal position for the back rest, while the other two notches represent positions of greater or less recline respectively.

It will now be seen that we have provided mechanism for reclining the back rest of a walk-over type chair, and it should be particularly noted as a special advantage of our invention that two seats in side by side relation enjoy the advantages hereof without at the same time overly weakening the structure for reversal of position. It will be understood that reversal of position is accomplished by pulling on the back rest next to the aisle and when this is done, the transverse frame member 18 bears the full force of reversing the walk-over linkage elements at the far end of the seat next to the vehicle window. In conventional seats the forces involved in this reversal operation are taken up in the back rest structure itself and no problem is presented. However, where a pair of individually arranged back rests are free to pivot independently one from the other, then the force on the transverse frame member 18 is increased in proportion. However, by providing the latch mechanism 20 it will be seen that the pivotal forces on the back rest 14 nearest the aisle are transmitted from an elevated point substantially along the tie rod 18 at least to a point half-way across the seat. In this way the torsion on the transverse frame member is minimized, and we find that reversal is accomplished without any risk of distortion.

Since minor variations of the preferred embodiment of our invention will now be apparent to those skilled in the art, it is not our intention to confine the invention to the precise form herein shown, but rather to limit it in terms of the appended claims.

Having thus disclosed and described a preferred embodiment of our invention, what we claim as new and desire to secure by Letters Patent of the United States is:

1. A chair for vehicles comprising a base, a seat mounted on said base, a back rest mounted on said base in operative relation with said seat, walk-over means for reversing the operative direction of said seat and back rest, a transverse frame member mounted on said walk-over means and arranged to be carried thereby from a position adjacent a corner edge of said seat on one side thereof to a corner edge of said seat on the other side thereof, means for pivotally connecting said back rest to said transverse frame member, and latch mechanism operatively connected to one side of said back rest at a substantially elevated point relative to the pivotal connection between said frame and said back rest on said walk-over means for fixing the position of said back rest relative to said transverse frame member and walk-over means in any one of a plurality of positions of recline.

2. A chair for vehicles wherein a double seat and a pair of back rests are mounted on a base, said chair having in combination walk-over means for reversing the operative direction of said seat and back rest, and recliner mechanism mounted on said walk-over means operatively associated with said back rests including a transverse frame member mounted on said walk-over means and arranged to be carried by said walk-over means from a position adjacent a corner edge of said seat on one side thereof to a corner edge of said seat on the other side thereof, means for pivotally mounting said back rest on said transverse frame, releasable latch mechanism mounted on said walk-over means, and multi-position stop means mounted on said back rest for receiving said latch and holding said back rest in fixed relation to said walk-over means in one of a plurality of positions of recline.

3. A chair for vehicles comprising a base, a double seat, a pair of back rests, walk-over means for reversing the operative direction of said seat and back rests including a transverse frame member arranged to be carried by said walk-over means from a position adjacent a corner edge of said seat on one side thereof to a corner edge of said seat on the other side thereof, said back rests pivoted to said transverse frame member at each side at their lower extremities, a pair of releasable latch mechanisms rigidly mounted on said walk-over means one in position adjacent to an elevated point at the outer side of each said back rest, and multi-position stop means mounted on each said back rest for receiving said latch mechanism and holding each said back rest in fixed relation to said walk-over means in one of a plurality of position of recline, whereby pivoting forces applied to said back rest either by the weight of an occupant or by forces intended to reverse the direction of said seat are transmitted to said walk-over means through said back rests and transverse frame.

References Cited in the file of this patent

UNITED STATES PATENTS

| | | |
|---|---|---|
| 435,224 | Hindman | Aug. 26, 1890 |
| 1,959,696 | Todd | May 22, 1934 |
| 2,812,802 | Gielow | Nov. 12, 1957 |
| 2,853,121 | Herider | Sept. 23, 1958 |